United States Patent
Geary et al.

(10) Patent No.: US 11,393,460 B2
(45) Date of Patent: Jul. 19, 2022

(54) AIRCRAFT SPEECH AMPLITUDE COMPENSATION

(71) Applicant: Gulfstream Aerospace Corporation, Savannah, GA (US)

(72) Inventors: Robert J. Geary, Savannah, GA (US); Matthew Wallace, Savannah, GA (US); John Marchetti, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

(21) Appl. No.: 16/949,652

(22) Filed: Nov. 9, 2020

(65) Prior Publication Data

US 2022/0148585 A1 May 12, 2022

(51) Int. Cl.
*G10L 15/20* (2006.01)

(52) U.S. Cl.
CPC .................................. *G10L 15/20* (2013.01)

(58) Field of Classification Search
CPC .............................. G10L 15/22; G10L 15/20
USPC ........................................................ 704/233
See application file for complete search history.

(56) References Cited

U.S. PATENT DOCUMENTS

| | | | | |
|---|---|---|---|---|
| 6,230,138 B1* | 5/2001 | Everhart | ................. | G10L 15/26 704/E15.044 |
| 6,360,203 B1* | 3/2002 | Prince | ..................... | H04M 9/08 704/226 |
| 2011/0188197 A1* | 8/2011 | Jackson | .................. | H05K 5/00 361/679.41 |
| 2019/0378536 A1* | 12/2019 | Emery | ..................... | H04R 3/00 |
| 2020/0156794 A1* | 5/2020 | Dowty | ............... | B64D 11/0601 |
| 2021/0255820 A1* | 8/2021 | Delaney | ........... | H04N 21/44218 |

FOREIGN PATENT DOCUMENTS

| | | | | |
|---|---|---|---|---|
| JP | 2004507141 A | * | 4/2004 | |
| KR | 20080069400 A | * | 7/2008 | ............... H04R 3/00 |

OTHER PUBLICATIONS

X. Zhang, C. Lu, J. Yin, H. Xie and T. Liu, "The Study of Two Novel Speech-Based Selection Techniques in Voice-User Interfaces," in IEEE Access, vol. 8, p. 217024-217032, 2020, doi: 10.1109/ACCESS.2020.3041649. (Year: 2020).*

(Continued)

*Primary Examiner* — Bharatkumar S Shah (74) *Attorney, Agent, or Firm* — LKGlobal | Lorenz & Kopf, LLP (57) ABSTRACT

Cabin audio systems for aircraft, aircraft cabin acoustics, aircraft cabin audio amplification, and audio amplification algorithms are provided. In particular, a speech amplification system including a first microphone configured to receive a first audio signal including an ambient noise and a second audio signal including a voice signal, a bandpass filter configured to filter the voice signal from the second audio signal, an amplifier configured to adjust an amplitude of the voice signal to generate an amplified voice signal in response to a control signal, a first speaker configured to receive the amplified voice signal and to provide the amplified voice signal a first seating location, a processor configured to generate the control signal in response to an amplitude of the first audio signal such that an amplitude of the amplified voice signal exceeds an amplitude of the ambient noise.

20 Claims, 5 Drawing Sheets

(56) References Cited

OTHER PUBLICATIONS

F. Felber, "An automatic volume control for preserving intelligibility," 34th IEEE Sarnoff Symposium, 2011, pp. 1-5, doi: 10.1109/SARNOF.2011.5876448. (Year: 2011).*

F. Felber, "An automatic volume control for preserving intelligibility," 34th IEEE Sarnoff Symposium, 2011, pp. 1-5, doi: 10.1109/SARNOF.2011.5876448. (Year: 2011) (Year: 2011).*

* cited by examiner

AIRCRAFT SPEECH AMPLITUDE COMPENSATION

TECHNICAL FIELD

The technical field relates generally to cabin audio systems for aircraft, and more particularly relates to aircraft cabin acoustics, aircraft cabin audio amplification, audio amplification algorithms, and aircraft equipped with electrically powered audio detection and amplification systems and noise compensation systems to provide speech amplification compensation in response to cabin audio interference levels.

BACKGROUND

The following information disclosed in this background section is only for enhancement of understanding of the background of the invention and therefore it may contain information that does not form the prior art that is already known in this country to a person of ordinary skill in the art.

Background noise in aircraft cabins increases stress and discomfort for passengers and cabin crew members, and adversely impacts passenger experience when using the inflight entertainment system and personal electronic devices. It also makes conversations between passengers, and communications between the aircraft crew and the passengers more difficult. While some aircraft settings may be more noise tolerant, such as cargo aircraft and the like, private aircraft passengers expect a higher level of comfort and lower cabin noise levels while travelling.

Reducing ambient noise in an aircraft cabin may be described in terms of sound pressure level, and/or speech interference level. Reducing the sound pressure level requires application of sound dampening and absorptive materials, use of vibration isolators and similar techniques. Alternatively, active noise cancelling systems may be employed which measure the ambient sound frequencies and pressure and attempt to cancel these sounds by actively transmitting noise cancellation signals, white noise, and other actively transmitted sounds. There are practical limits to what can be achieved with these techniques due to the impacts on aircraft weight, range, interior options and cost. As such, it is desirable to overcome these problems in order to provide a system to compensate for aircraft cabin noise. In addition, other desirable features and characteristics will become apparent from the subsequent summary and detailed description, and the appended claims, taken in conjunction with the accompanying drawings and this background.

SUMMARY

Disclosed herein are aircraft noise compensation systems, aircraft noise compensation algorithms, aircraft and related processing systems for provisioning aircraft, methods for making and methods for operating such systems, and other vehicles equipped with onboard noise compensation systems. By way of example, and not limitation, there is presented an aircraft having a system for filtering and amplifying desired audio within an aircraft cabin.

In a first non-limiting embodiment, a flight propulsion system may include, but is not limited to, a speech amplification system including a first microphone configured to receive a first audio signal including an ambient noise and a second audio signal including a voice signal, a bandpass filter configured to filter the voice signal from the second audio signal, an amplifier configured to adjust an amplitude of the voice signal to generate an amplified voice signal in response to a control signal, a first speaker configured to receive the amplified voice signal and to provide the amplified voice signal a first seating location, and a processor configured to generate the control signal in response to an amplitude of the first audio signal such that an amplitude of the amplified voice signal exceeds an amplitude of the ambient noise.

In accordance with another aspect of the present disclosure, a method for determining an amplitude of an ambient noise with a first microphone at a first seating location, receiving an audio signal including a voice signal with a second microphone at a second seating location, filtering, with a bandpass filter, the audio signal to extract the voice signal, amplifying the voice signal in response to the amplitude of the ambient noise such that an amplitude of the voice signal exceeds an amplitude of the ambient noise level, and providing the amplified voice signal to a first speaker located at the first seating location.

In accordance with another aspect of the present disclosure, an aircraft speech amplification system including a plurality of seating locations within an aircraft passenger compartment, first microphone for detecting an ambient sound level within the aircraft passenger compartment, a second microphone located proximate to one of the plurality of seating locations configured to receive an audio signal including an ambient audio stream and a voice audio stream, a filter configured to pass the voice audio stream from the audio signal and suppress the ambient audio stream, and an amplifier configured to amplify the voice audio stream in response to the ambient sound level to generate an amplified voices audio stream, and a first speaker located proximate to a second of the plurality of seating locations for generating a sound wave in response to the amplified voice audio stream towards the second of the plurality of seating locations.

The above advantage and other advantages and features of the present disclosure will be apparent from the following detailed description of the preferred embodiments when taken in connection with the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the disclosure, and such exemplifications are not to be construed as limiting the scope of the disclosure in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Noise level within an aircraft cabin is an obvious and important comfort factor for passengers within aircraft. Noise level is often gauged by occupants against the clarity of desired audio versus the amplitude of undesired audio rather than actual sound pressure level. For example, can an occupant understand a conversation with another occupant over the background noise of the aircraft? Rather than focusing on background noise reduction of the actual sound pressure level, the currently disclosed systems and methods instead effectively reduces the Speech Interference Level (SIL) by improving the ratio of desired voice audio to the background noise level at each seat location and at other key locations in the cabin. While not actually reducing the noise level in the cabin, the subtle increase in the level of desired voices at one or more seat locations, in addition to making the voices easier to hear above the background noise, will create a passenger perception of a quieter cabin.

Figure 1:
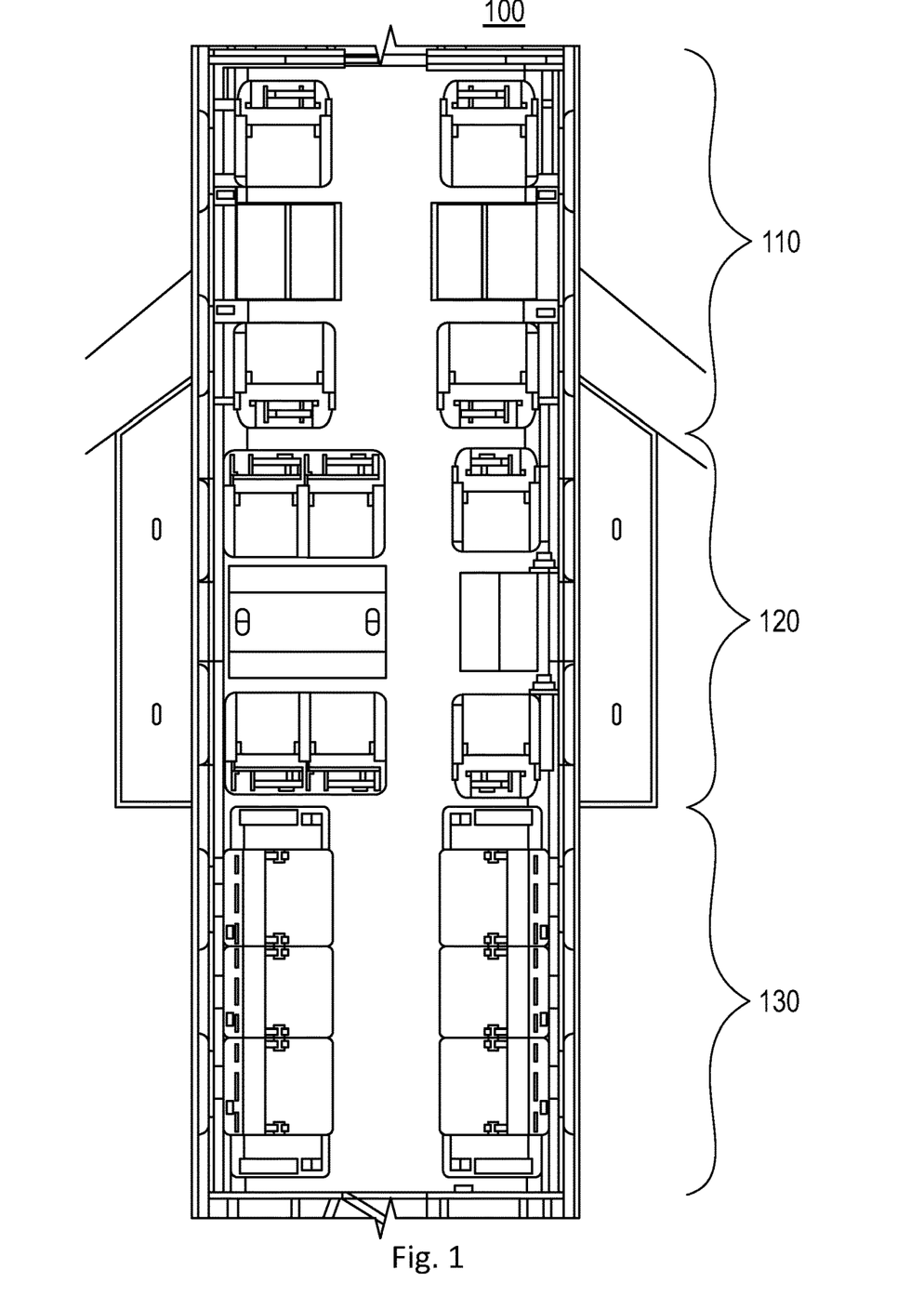
FIG. 1 is a top view illustrating an exemplary aircraft passenger compartment for implementation of the aircraft speech amplitude compensation system in accordance with the teachings of the present disclosure.

Turning now to FIG. 1, a top view of exemplary aircraft passenger compartment 100 for implementation of the aircraft speech amplitude compensation system in accordance with an embodiment of the present disclosure is shown. In this exemplary embodiment, the aircraft passenger compartment 100 may be divided into zones, such as a forward cabin 110, mid cabin 120 and aft cabin 130. Each seating location within aircraft passenger compartment 100 may be equipped with one or more microphones and speakers.

In order to increase the clarity of desired audio, such as conversations among passengers, the exemplary system may first be operative to determine an ambient background sound pressure level for the passenger compartment 100 or for each of the zones of the passenger compartment. The exemplary system is then operative to record audio at a specific seating position. The system may then filter the recorded audio to isolate human speech frequencies. For example, human speech frequencies may range from between about 85 Hz to about 180 Hz for adult males and from about 165 Hz to about 255 Hz for adult females. The system is then configured to amplify the isolated frequency range and to couple this amplified frequency range to a specific speaker, all speakers within a passenger compartment zone, such as the forward cabin 110, or all speaker within all of the zones within the passenger compartment 100. In one exemplary embodiment, the isolated frequency range is amplified in response to the detected ambient background sound pressure level such that the speech is amplified to be clear above the background sound pressure level. It may be desirable to amplify the speech enough to be clear to a listener, but not overly amplified to seem artificially broadcast.

In another exemplary configuration, the system may be configured to determine probable participants in a conversation such as by detecting alternating speech between two seating positions. In this example, the system may then only provide the amplified speech to the probable participant seating position and not to the entire compartment zone or entire passenger compartment. The system may initially broadcast the amplified speech to the passenger compartment zone, but gradually eliminate coupling to speakers where no speech is being detected. Thus, a non-participant in the conversation will not have the speech amplified at their seating position while participants may continue to have amplified speech at their positions. Additionally, the system may be configured to recognize selective speech patterns from a specific occupant to further enhance detected speech.

Figure 2:
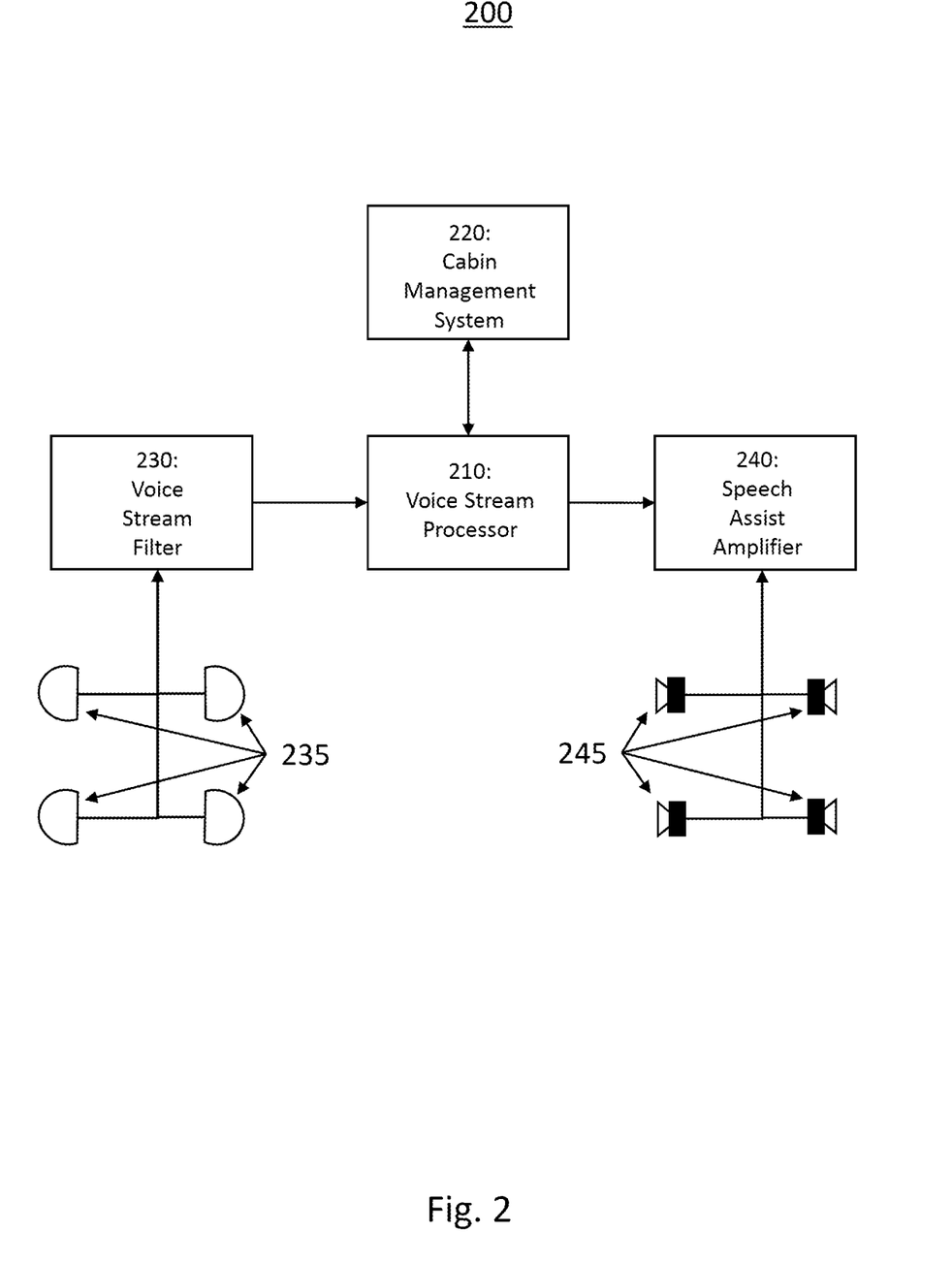
FIG. 2 is a block diagram illustrating an exemplary aircraft system for implementing the method for aircraft speech amplitude compensation in accordance with the teachings of the present disclosure.

Turning now to FIG. 2, a block diagram illustrative of an exemplary aircraft system 200 for implementing the method for aircraft speech amplitude compensation is shown. The exemplary aircraft system 200 may include a cabin management system 220, a voice stream processor 210, a voice stream filter 230, a speech assist amplifier 240, a plurality of microphones 235, and a plurality of speakers 245.

In this exemplary embodiment, at least one of the plurality of microphones 235 is operative to detect cabin audio at a seating location and to generate an electronic audio signal in response to the detected cabin audio. Each of the plurality of microphones 235 may be located proximate to a passenger seating position. A microphone may be mounted in an overhead surface, in a seatback or other appropriate aircraft surface. In one embodiment, directional microphones may be employed such that the microphone reception is focused on an area within the seating position where an occupant's head would be. These directional microphones advantageously reduce sound bleed over from other aircraft occupants as well as may be used to reduce background noise reception. In another exemplary embodiment, two or more microphones may be positioned near each seating position and passive acoustic localization techniques may be employed to detect speech only from an occupant of the designated seating position. Sound phase information or the like may be used to determine the source of the detected sounds at each of the plurality of microphones proximate to a designated seating position or may be used to isolate speech at a desired seating location.

The voice stream filter 230 is configured to receive the electronic audio signal from one or more of the plurality of microphones 235 for suppression of audio outside the frequency band of human conversation. The voice stream filter 230 may include one or more analog filters, such as an 80-260 Hz bandpass filter, or may include a digital to analog converter and a digital signal processor for digitally filtering a digitized electronic audio signal. In one exemplary embodiment, the voice stream filter 230 may be configured to couple the electronic audio signal directly to the voice stream processor 210 without filtering such that the voice stream processor 210 may determine an ambient background noise within the aircraft at one or more of the various seating positions. Alternatively, the voice stream filter 230 may include circuitry to determine the ambient background noise within the aircraft, to use this determination to filter the electronic signal to extract the voice information and/or to couple this information to the voice stream processor 210 for use in determining an optimal amplification level for the voice information extracted from the electronic audio signal.

In this exemplary embodiment, the voice stream processor 210 may be configured to receive the voice information extracted from the electronic audio signal from the voice stream filter 230, to determine an amplification level to amplify the voice information as well as which seated locations to provide the amplified voice information to. In one exemplary embodiment, voice information from each seated passenger location, as well as identified voice streams not referenced to specific locations, may be supplied to a voice stream processor 210 from the plurality of microphones 235 via the voice stream filter 230. Based on configuration information dynamically provided from the cabin management system 220, the voice stream processor 210 may weight, mix, and level new audio streams to be routed to one or more speech assist amplifiers 240 for amplification and then coupled to one or more of the plurality of speakers 245 adjacent to each seated passenger position in the cabin, as well as to certain other optional locations. In one exemplary embodiment, the voice stream processor 210 may optimize the speech to noise ratio for each cabin occupant in response to measured ambient background noise at the cabin occupant's seating position, average measured ambient background noise within a passenger compartment zone, or in response to instructions from the cabin management system 220 which may be derived in response to user inputs, speech location analysis, and/or cabin ambient background noise.

The cabin management system 220 may be configured to receive and/or determine information related to occupants of the various passenger seating positions and generate control information to couple to the voice stream processor 210. The voice stream processor 210 may then configure the audio streams sent to each of the plurality of speakers 245 such that the voice content is selected and optimized for a variety of factors and circumstances. For example, information may be received from the cabin management system 220 identifying optimized conversation groups between noncontiguous seats. This information may be determined in response to user input from the various passenger locations or may be determined in response to conversation patterns indicative of an interaction between passengers, or the like. The cabin management system 220 may be further configured for implementation of default and situational privacy settings. For example, extracted voice streams from one zone of the passenger compartment, such as the forward cabin, may not be coupled to speakers in other zones of the passenger compartment. The cabin management system 220 may optimize conversation level in physical seating groups, such as zones of the passenger compartment or groups of passenger seating, such as a table or the like. The cabin management system 220 may optimize audio streams to facilitate group phone conversations, such as a virtual speaker phone.

Figure 3:
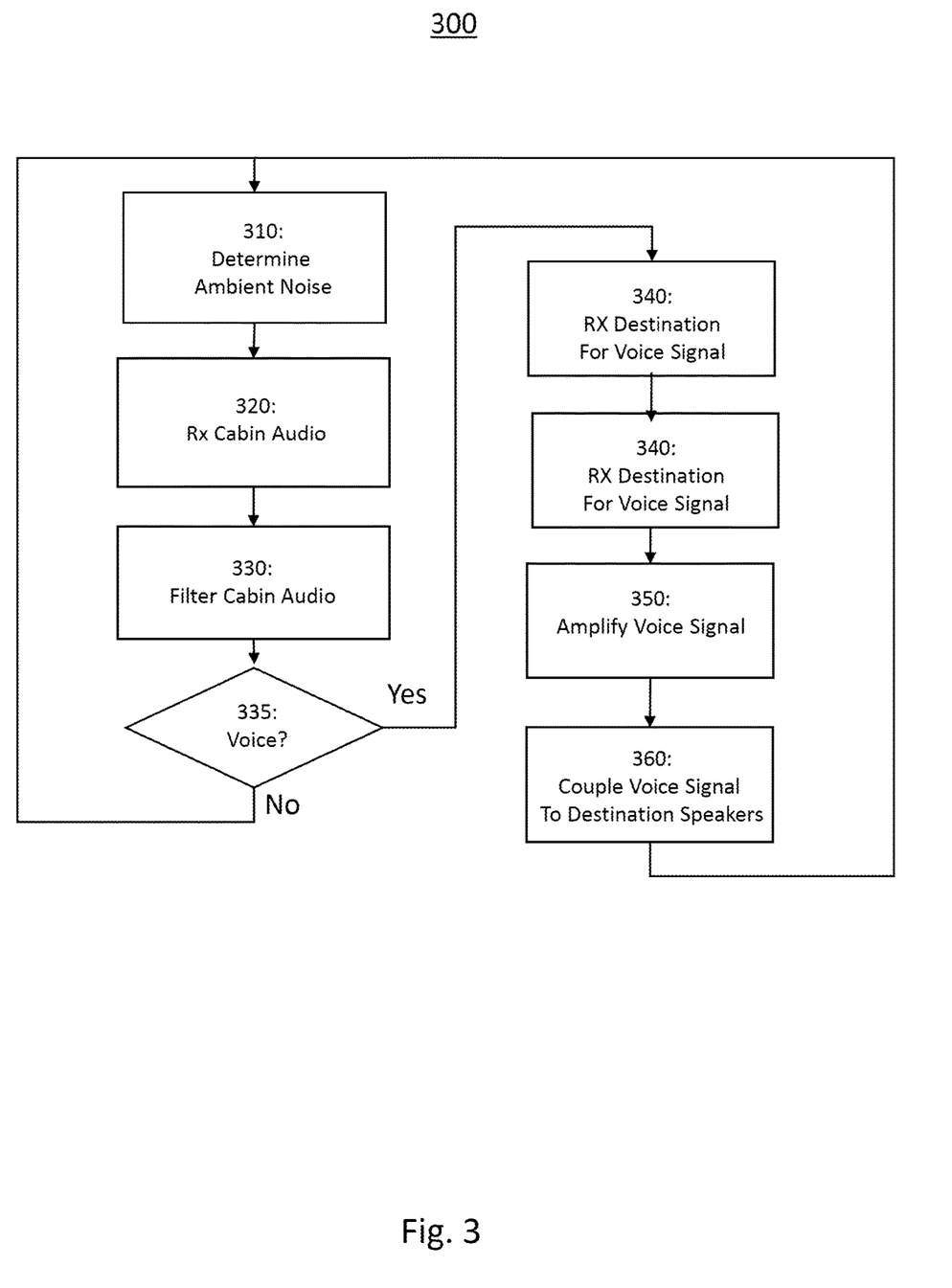
FIG. 3 is a flow diagram illustrating a non-limiting embodiment of a method for aircraft speech amplitude compensation in accordance with the teachings of the present disclosure.

Turning now to FIG. 3, a flow diagram illustrating a non-limiting embodiment of a method 300 of for aircraft speech amplitude compensation in accordance with the teachings of the present disclosure is shown. In this exemplary embodiment, the method is first operative to determine 310 a passenger cabin ambient sound level. The ambient sound level may be determined for each of the passenger seating locations, for each of the passenger cabin zones, such as the forward cabin, or for the complete passenger cabin. The ambient sound level for the passenger cabin zone or the complete passenger cabin may be determined in response to a maximum sound level detected at one of the seating positions or in response to an average or mean sound level calculated from multiple sound level measurements at multiple seating locations within the zone or within the passenger cabin.

At step 320, a cabin audio is received, including voice information a cabin audio including voice information at one or more microphones positioned proximate to a seating position. The method is next operative to filter 330 the received cabin audio to generate a filtered cabin audio signal in order to extract information received over the frequency range of the human voice. The method is next operative to determine 335 if voice information is present within the filtered cabin audio. The method may detect 335 cabin audio including voice information by filtering the detected audio signals outside of frequencies within the human range of speech and determining if audio signals are present within the filtered cabin audio signal.

If no voice information is detected 335 within the cabin audio, the method is then operative to return to determine 310 a subsequent ambient noise level. If voice information is detected 335 within the cabin audio, the method is then operative to determine 340 a destination for the amplified voice signal. A destination for the voice signal may be one or more seating locations, passenger compartment zones, or the entire passenger compartment. The destination may be determined in response to a control signal from a cabin management system or the like which may be indicative of a default conversational zone, such as the forward cabin or a conference table, or may be indicative of a user selection of conversational participants. In an exemplary embodiment, the method may initially begin with a default conversational zone, may detect the seating locations of the voice audio origins and reduce the amplification only to seating positions of those passengers engaged in the conversation or those actively requesting to join via user interface or specific voice commands. For example, occupants desiring to engage in the conversation may say a trigger word which begins to amplify voice signals detected at their seating position. In another exemplary embodiment, occupants wishing to engage in the conversation may engage and disengage the voice amplification at their seating location using a user interface such as a button or touch screen selection or verbal command.

Once the destination for the voice signal is determined, the method is then operative to amplify 350 the voice signal in response to the ambient noise level at the destination. For example, the voice signal may be amplified over the ambient noise level such that the speech interference level (SIL) is at a desired level. In one exemplary embodiment, the voice signal is amplified at a conversation participant's seating position such that the SIL exceeds a predetermined level for a desired level of speech comprehension. In one example, the voice signal is amplified enough to be improve comprehension by the conversation participant, but not overly amplified that the voice signal seems broadcasted. In addition, the method may be configured to recognize selective speech patterns from a specific occupant to further enhance the desired voice signal. The amplified voice signal is then coupled 360 to one or more destination speakers. The destination speakers correspond to the previously determined destination for the amplified voice signal.

Figure 4:
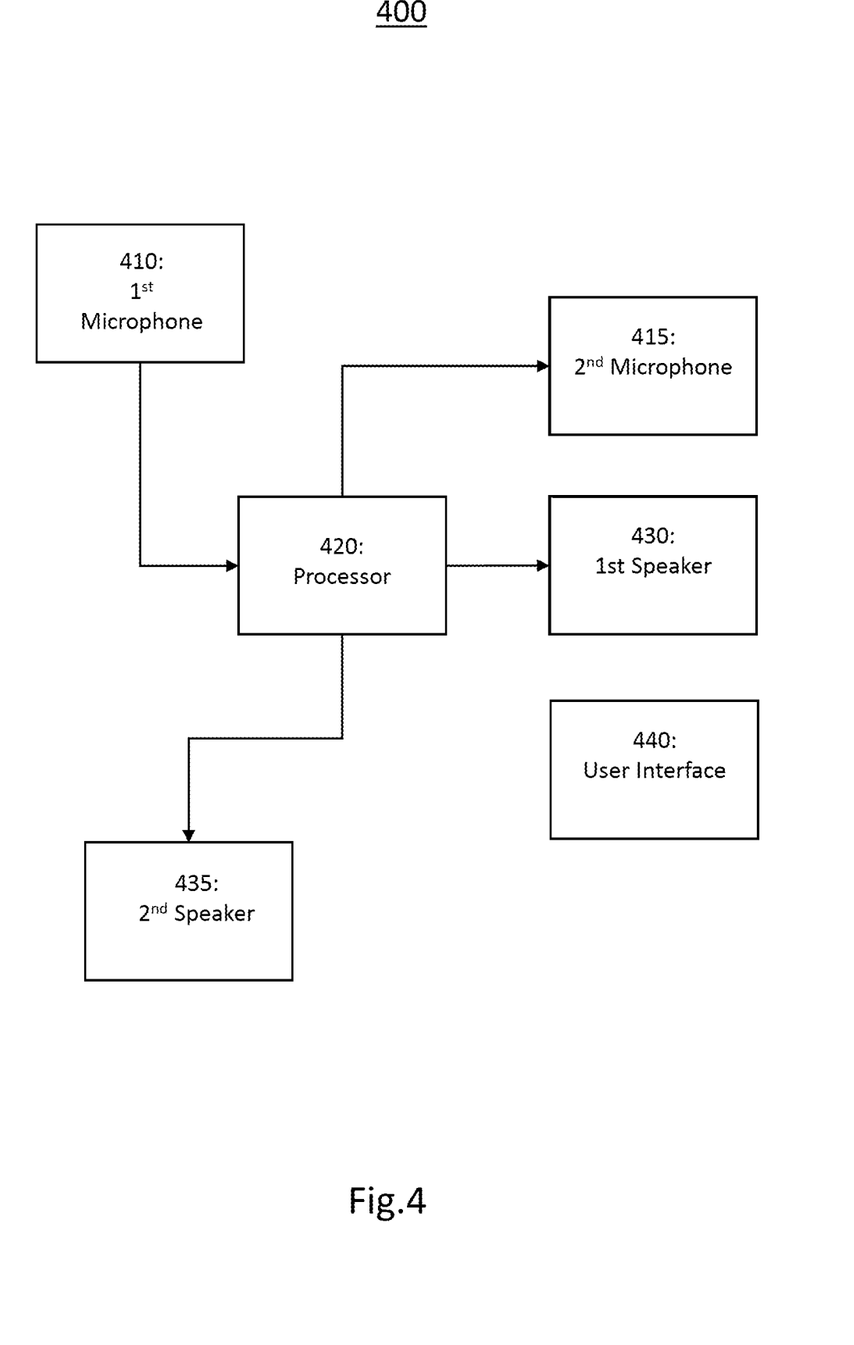
FIG. 4 is a simplified block diagram illustrating another non-limiting embodiment of a system for aircraft speech amplitude compensation in accordance with the teachings of the present disclosure.

Turning now to FIG. 4, a block diagram illustrating a system 400 for aircraft speech amplitude compensation is shown. The exemplary system 400 may include a first microphone 410, a second microphone 415, a processor 420, a first speaker 430, a second speaker 435, and a user interface 440.

In this exemplary embodiment, a first speaker 430 may be disposed at a first passenger seating location. The first speaker 430 may be configured to receive the amplified voice signal and to provide the amplified voice signal to the first seating location. In providing the amplified voice signal to the first seating position, the first speaker 430 may convert an electronic amplified voice signal to an acoustic wave via the first speaker 430. Ideally, the acoustic wave way be directed towards the ears, or the approximated region of an average occupant's ears, of an occupant in the first seating position.

The exemplary system may further include a first microphone 410 configured to receive a first audio signal including an ambient noise and a second audio signal including a voice signal from a location inside an aircraft passenger compartment. In an exemplary embodiment, the first microphone 410 may be located central to a passenger compartment zone, such as in the middle of a conference table, in the ceiling of a portion of the aircraft cabin, or the like. The first microphone 410 may be used to receive an audio signal used to determine an ambient noise level within the cabin or the portion of the cabin. The first microphone 410 may be further operative to receive voice streams when present in addition to the ambient noise in the aircraft cabin. In one exemplary embodiment, the first speaker 430 is collocated with a second microphone 435 and where the amplitude of the ambient noise is determined in response to a third audio signal received at the second microphone 435. For example, the ambient noise level may be measured at the first passenger location such that an amplified voices signal may be amplified and broadcast at an amplitude adjusted in response to the ambient noise level at the first passenger location as opposed to an average ambient noise level or an ambient noise level determined at another location within the aircraft cabin.

The exemplary system 400 may further include a processor 420 configured to generate a control signal in response to an amplitude of the first audio signal such that an amplitude of the amplified voice signal exceeds an amplitude of the ambient noise. The processor 420 may be an analog signal processing device with discreet components, an analog audio processor, or a digital signal processor including an analog to digital converter and a digital to analog converter. In one exemplary embodiment, the processor 420 may further include a bandpass filter configured to filter the voice signal from the second audio signal and an amplifier configured to adjust an amplitude of the voice signal to generate an amplified voice signal in response to a control signal. In one example, the processor 420 may be configured to generate the control signal in response to detecting the voice signal within the second audio signal. In this example, an amplified signal including the frequency range of human speech is only provided to the first speaker 430 when there are voice signals present.

In another exemplary embodiment, a second speaker 435 may be provided wherein the second speaker 435 is configured to receive the amplified voice signal and to provide the amplified voice signal a second seating location. In another embodiment, the amplified voice signal may be provided to a plurality of speakers within a portion of an aircraft passenger compartment. For example, in a seating group in an aircraft cabin, such as a conference table, the amplified voice signal may be provided to each of the seating locations around the conference table. Likewise, directional microphones may be employed to estimate a speaking occupant and to not provide the amplified voice signal to the seating location of the speaking occupant.

The first seating location, or the seating location of the listener, may be determined in a number of ways. For example, a default seating location may be determined such that all seating locations within a section of the aircraft cabin, such as the forward cabin, receive the amplified voice signal when the voice signal is detected within that section of the aircraft cabin. Alternatively, an occupant may elect to be part of a conversation by providing a user input selection on a user interface 440. The user interface 440 may be a button or a selection on a graphical user interface displayed on a display device. Furthermore, an occupant may wish not to be disturbed by a conversation and may elect for a voice signal not to be amplified at their seating location or that a voice cancelling signal, such as a phase inverted amplification of the voice signal, be provided at their seating location. In another exemplary embodiment, the first seating location may be determined in response to detecting a prior speech event at a second microphone 415 located proximate to the first seating location. For example, if no voice signals are detected for a particular seating location, it may be assumed that the occupant is not participating in the conversation and amplification of the voice signal may be halted at their seating location. In this example, an entire section of the aircraft may initially receive the amplified voice signal and seating locations may be gradually eliminated from the conversation if no voice response is detected at a particular seating location for a duration of time. A cabin management system may be configured to provide an indication of the first seating location, such as a default setting or a user input, such as a voice command or trigger word, and may be used to dynamically select seating locations to receive amplified voice signals.

In another exemplary embodiment, an aircraft speech amplification system may be provided with a plurality of seating locations within an aircraft passenger compartment. A first microphone 410 is employed for detecting an ambient sound level within the aircraft passenger compartment. A second microphone 415 may be located proximate to one of the plurality of seating locations configured to receive an audio signal including an ambient audio stream and a voice audio stream. A processor 420 including a filter may be configured to pass the voice audio stream from the audio signal and suppress the ambient audio stream. The processor 420 may further include an amplifier configured to amplify the voice audio stream in response to the ambient sound level to generate an amplified voices audio stream.

A first speaker 430 may be located proximate to a second of the plurality of seating locations for generating a sound wave in response to the amplified voice audio stream towards the second of the plurality of seating locations. The second of the plurality of seating locations may be determined in response to a user selection on a user interface located proximate to the second of the plurality of seating locations. In addition, the exemplary system 400 may further include a plurality of speakers within a portion of the aircraft passenger compartment, wherein the amplified voice audio stream is coupled to each of the plurality of speakers.

Figure 5:
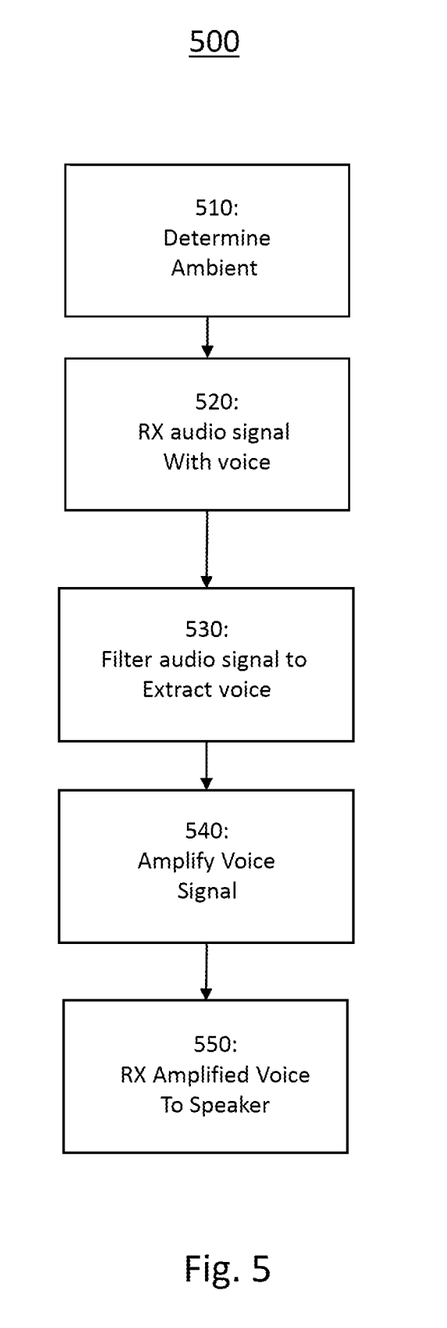
FIG. 5 is a flow diagram illustrating another non-limiting embodiment of a method for aircraft speech amplitude compensation in accordance with the teachings of the present disclosure.

Turning now to FIG. 5, a flow diagram illustrating a non-limiting embodiment of a method 500 of providing aircraft speech amplitude compensation in accordance with the teachings of the present disclosure is shown. The method is first operative to determine 510 an amplitude of an ambient noise with a first microphone at a first seating location. The amplitude may be determined in response to a sound pressure level or sound amplitude at single location or may be determined in response to a number of measurements made at different time interfaces or at different spatial locations within the aircraft cabin. The ambient noise level may be used as a basis for the application level of voice signals at different seating locations within the aircraft cabin.

The method is next configured for receiving 520 an audio signal including a voice signal with a second microphone at a second seating location. The second microphone may be located proximate to the second seating location, such as in a seatback of the second seating location or may be a microphone located centrally within an aircraft cabin or section or an aircraft cabin. The second microphone may include one or more sounds sensors or detectors for implementing a directional antenna for estimating a location of a source of the sound.

The method is next operative to filter 530 the audio signal to extract the voice signal. The audio signal may be filtered with one or more analog bandpass filter, configured to suppress any sound outside of the frequency range of the human range of speech. Alternatively, a digital signal filter may be used to suppress the non-speech signals.

The method may next be configured for amplifying 540 the voice signal in response to the amplitude of the ambient noise such that an amplitude of the voice signal exceeds an amplitude of the ambient noise level. The voice signal may be amplified such that a ratio of the amplified voice signal and the ambient noise achieves a desired speech interference level such that speech may be clearly understood over the ambient noise at the desired seating location. In one exemplary the amplifying of the voice signal is performed in response to detecting the voice signal within the audio signal.

The method is next configured for providing 550 the amplified voice signal to a first speaker located at the first seating location. The first seating location may be determined in response to an indication by a cabin management system, such as a default location, or may be determined in response to a selection on a user interface. Alternatively, the first seating location may be determined in response to detecting a prior speech event at a second microphone located proximate to the first seating location In one example, the first seating location and the second seating location may be contiguous seating locations and wherein the first seating location is determined in response to the second seating location.

In another exemplary embodiment, the amplified voice signal may be provided to a second speaker at a third seating location or to a plurality of speakers throughout a passenger compartment section or through a passenger compartment. Alternatively, the method may be configured to perform a phase inversion of the amplified voice signal to generate a phase inverted amplified voices signal and providing the phase inverted amplified voice signal to a second speaker located at a third seating location.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A speech amplification system comprising:
   a first microphone configured to receive a first audio signal including a first ambient noise and a first voice signal at a first seating position;
   a second microphone configured to receive a second audio signal at a second seating position including a second ambient noise and a second voice signal;
   a bandpass filter configured to isolate the second voice signal from the second ambient noise in the second audio signal;
   an amplifier configured to adjust an amplitude of the second voice signal to generate an amplified voice signal in response to a control signal;
   a first speaker at the first seating position configured to receive the amplified voice signal and to provide the amplified voice signal at the first seating location wherein the amplified voice signal is coupled to the first speaker in response to a prior reception of the first voice signal at the first microphone; and
   a processor configured to determine an amplitude of the first ambient noise, generate the control signal in response to the amplitude of the first ambient noise such that an amplitude of the amplified voice signal exceeds the amplitude of the first ambient noise.

2. The speech amplification system of claim 1, further comprising a user interface, wherein the first seating location is determined in response to a selection made using the user interface.

3. The speech amplification system of claim 1, wherein the processor is further configured to generate the control signal in response to detecting the second voice signal within the second audio signal.

4. The speech amplification system of claim 1, further including a second speaker configured to receive the amplified voice signal and to provide the amplified voice signal at a third seating location.

5. The speech amplification system of claim 1, wherein the amplified voice signal is provided to a plurality of speakers within a portion of an aircraft passenger compartment.

6. The speech amplification system of claim 1, wherein the first speaker is collocated with the first a second microphone and where the amplitude of the first ambient noise is determined in response to a third audio signal received at the second microphone.

7. The speech amplification system of claim 1, wherein the first seating location is determined in response to detecting a prior speech event at the first microphone located proximate to the first seating location.

8. The speech amplification system of claim 1, further including a cabin management system configured to provide an indication of the first seating location.

9. A method comprising:
   receiving, with a first microphone, a first audio signal including a first ambient noise and a first voice signal at a first seating position
   determining an amplitude of the first ambient noise at the first seating location;
   receiving a second audio signal including a second voice signal and a second ambient noise with a second microphone at a second seating location;
   filtering, with a bandpass filter, the second audio signal to extract the second voice signal;
   amplifying the second voice signal in response to the amplitude of the first ambient noise to generate an amplified voice signal such that an amplitude of the second voice signal exceeds the amplitude of the first ambient noise; and
   providing the amplified voice signal to a first speaker located at the first seating location wherein in response to the reception of the first voice signal at the first microphone.

10. The method of claim 9, wherein the first seating location is determined in response to an indication by a cabin management system.

11. The method of claim 9, wherein the first seating location is determined in response to a selection on a user interface.

12. The method of claim 9, wherein the first seating location is determined in response to detecting the first voice signal with the first microphone located proximate to the first seating location.

13. The method of claim 9, wherein the amplified voice signal is further provided to a second speaker at a third seating location.

14. The method of claim 9, wherein amplifying the second voice signal is performed in response to detecting the second voice signal within the second audio signal.

15. The method of claim 9, wherein the amplified voice signal is provided to a plurality of speakers within a portion of an aircraft passenger cabin.

16. The method of claim 9, wherein the first seating location and the second seating location are contiguous seating locations and wherein the first seating location is determined in response to the second seating location.

17. The method of claim 9, further including phase inverting the amplified voice signal to generate a phase inverted amplified voice signal and providing the phase inverted amplified voice signal to a second speaker located at a third seating location.

18. An aircraft speech amplification system comprising:
first microphone for detecting an ambient sound level at a first seating location;
a second microphone located proximate to a second seating location configured to receive an audio signal including an ambient audio stream and a voice audio stream;
a filter configured to pass the voice audio stream from the audio signal and suppress the ambient audio stream;
an amplifier configured to amplify the voice audio stream in response to the ambient sound level to generate an amplified voice audio stream; and
a first speaker located proximate to the first seating location for generating a sound wave in response to the amplified voice audio stream wherein the amplified voice audio stream is coupled to the first speaker in response to a prior voice signal received at the first microphone.

19. The aircraft speech amplification system of claim 18, wherein the first seating location is determined in response to a user selection on a user interface located proximate to the first seating location.

20. The aircraft speech amplification system of claim 18, further including a plurality of speakers within an aircraft passenger compartment, wherein the amplified voice audio stream is coupled to each of the plurality of speakers.

* * * * *